United States Patent
Goebl

(10) Patent No.: US 9,038,057 B2
(45) Date of Patent: May 19, 2015

(54) METHOD FOR REPLACING AN ILLEGITIMATE COPY OF A SOFTWARE PROGRAM WITH A LEGITIMATE COPY AND CORRESPONDING SYSTEM

(75) Inventor: Thomas Goebl, Bad Vigaun (AT)

(73) Assignee: SONY DADC Austria AG, Anif (AT)

( * ) Notice: Subject to any disclaimer, the term of this patent is extended or adjusted under 35 U.S.C. 154(b) by 656 days.

(21) Appl. No.: 13/182,832

(22) Filed: Jul. 14, 2011

(65) Prior Publication Data

US 2012/0023490 A1 Jan. 26, 2012

(30) Foreign Application Priority Data

Jul. 26, 2010 (EP) .................................. 10007753

(51) Int. Cl.
G06F 9/44 (2006.01)
G06F 21/12 (2013.01)
G06F 21/10 (2013.01)

(52) U.S. Cl.
CPC ................ *G06F 21/12* (2013.01); *G06F 21/10* (2013.01); *G06F 21/105* (2013.01)

(58) Field of Classification Search
CPC ........ G06F 21/10; G06F 21/21; G06F 21/105
USPC ......................................................... 717/173
See application file for complete search history.

(56) References Cited

U.S. PATENT DOCUMENTS

| | | | | |
|---|---|---|---|---|
| 5,754,864 A * | 5/1998 | Hill | ............................... | 717/173 |
| 7,370,008 B1 * | 5/2008 | Hill | ............................... | 726/27 |
| 7,673,297 B1 * | 3/2010 | Arsenault et al. | ............. | 717/168 |
| 8,307,437 B2 * | 11/2012 | Sebes et al. | ..................... | 717/172 |
| 8,375,454 B2 * | 2/2013 | Sun | .................................. | 726/21 |
| 2002/0087876 A1 * | 7/2002 | Larose | ............................ | 713/200 |
| 2004/0193884 A1 * | 9/2004 | Molaro et al. | ................. | 713/175 |
| 2005/0246537 A1 * | 11/2005 | Gunyakti et al. | ............... | 713/176 |

(Continued)

FOREIGN PATENT DOCUMENTS

| | | |
|---|---|---|
| CN | 1577272 A | 2/2005 |
| CN | 1694031 A | 11/2005 |

(Continued)

OTHER PUBLICATIONS

Anckaert et al. "Software Piracy Prevention through Diversity", Oct. 2004, ACM.*

(Continued)

*Primary Examiner* — Anna Deng
*Assistant Examiner* — Junchun Wu
(74) *Attorney, Agent, or Firm* — Oblon, McClelland, Maier & Neustadt, L.L.P.

(57) ABSTRACT

A method for replacing an illegitimate copy of a software program with a legitimate copy is provided, the method including: determining metadata of a first software program running on a computer; transmitting a patch from a first server to the computer, if the metadata does not correspond to metadata of a legitimate copy of the software program; generating a second software program by replacing at least a part of the first software program with the patch; displaying a graphical user interface using code components of the patch and asking a user for an authentication token; acquiring the authentication token from a second server; verifying the authentication token; and labeling the second software program as a legitimate copy if the authentication token is verified. A corresponding system is also provided.

16 Claims, 3 Drawing Sheets

(56) References Cited

U.S. PATENT DOCUMENTS

| | | | |
|---|---|---|---|
| 2006/0026304 | A1 | 2/2006 | Price |
| 2006/0085857 | A1* | 4/2006 | Omote et al. .................... 726/24 |
| 2007/0107057 | A1* | 5/2007 | Chander et al. ................. 726/22 |
| 2009/0199305 | A1* | 8/2009 | Michiels et al. ............. 717/170 |
| 2010/0058478 | A1* | 3/2010 | Shetty et al. .................... 726/26 |
| 2010/0212028 | A1* | 8/2010 | Eriksson et al. ............. 717/177 |
| 2010/0257603 | A1* | 10/2010 | Chander et al. ................. 726/22 |
| 2012/0192173 | A1* | 7/2012 | Price ............................. 717/172 |
| 2013/0212575 | A1* | 8/2013 | Ito et al. ............................. 718/1 |

FOREIGN PATENT DOCUMENTS

| | | | | |
|---|---|---|---|---|
| CN | 1889088 | A | 1/2007 | |
| CN | 101002211 | A | 7/2007 | |
| CN | 101506817 | A | 8/2008 | |
| CN | 101305378 | A | 11/2008 | |
| CN | 100461064 | C | 2/2009 | |
| CN | 101770794 | A | 7/2010 | |
| EP | 1591865 | A2 * | 11/2005 | ................ G06F 1/00 |
| EP | 2057575 | B1 * | 1/2010 | ............. G06F 21/00 |

OTHER PUBLICATIONS

Liu et al., "Automated Security Checking and Patching Using TestTalk", 2000, IEEE.*

Chinese Office Action with English translation and Search Report issued on Jan. 27, 2015 in Application No. 2011102130148, citing documents AA, An, AO, AP, AQ, AR, AS, AT, and AU therein (14 pages).

* cited by examiner

METHOD FOR REPLACING AN ILLEGITIMATE COPY OF A SOFTWARE PROGRAM WITH A LEGITIMATE COPY AND CORRESPONDING SYSTEM

The invention relates to a method for replacing an illegitimate copy of a software program with a legitimate copy, a corresponding system and a software patch stored on a non-transitory medium

BACKGROUND

The use of illegitimate copies of software programs is not only a copyright infringement but also a severe concern of software producers and software developers, since they loose a lot of money due to the un-authorized distribution of their intellectual property. Therefore, a plurality of techniques have been developed, which identify illegitimate copies of software programs and, afterwards, disallowing certain features of the software program, for instance update functionality or online play or preventing the overall usage of the software program. However, with these known techniques it is only possible to hinder a user of an illegitimate copy of the software program to use it or at least to decrease the usability of the software program.

Thus, there is a need for providing a method and a system for changing a user of an illegitimate copy of the software program into a user of a legitimate copy of the software program.

The object is solved by a method for replacing an illegitimate copy of the software program with a legitimate copy according to claim 1, a corresponding system according to claim 13 and a software patch according to claim 15.

Further embodiments are defined in the dependent claims.

Further details of the invention will become apparent from the consideration of the drawings and ensuing description.

DETAILED DESCRIPTION

In the following, embodiments of the invention are described. It is important to note that all described embodiments in the following and their properties and technical features may be combined in any way, i.e. there is no limitation that certain described embodiments, properties and technical features may not be combined than others.

Figure 1:
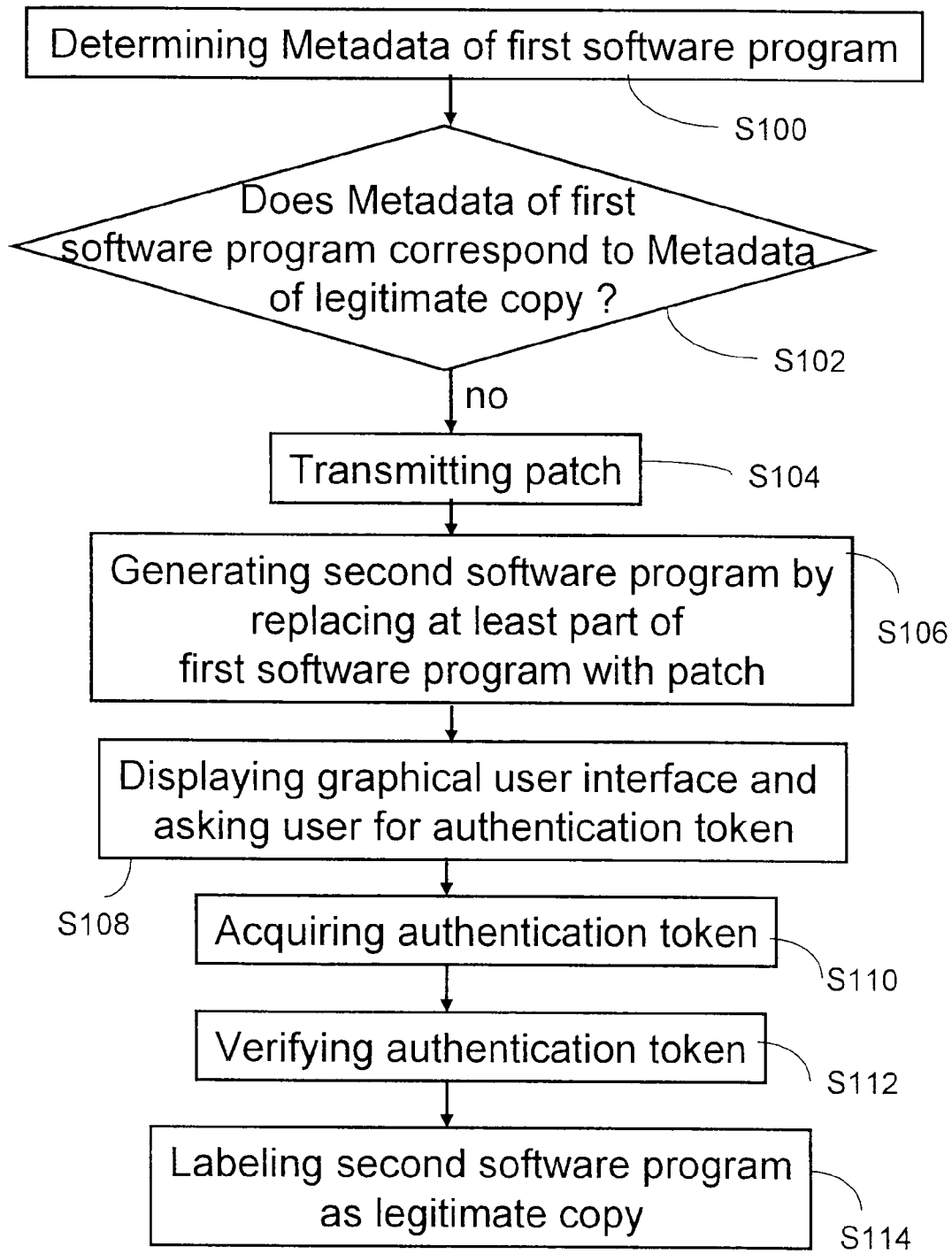
FIG. 1 shows schematically steps of an embodiment of the invention.
Figure 2:
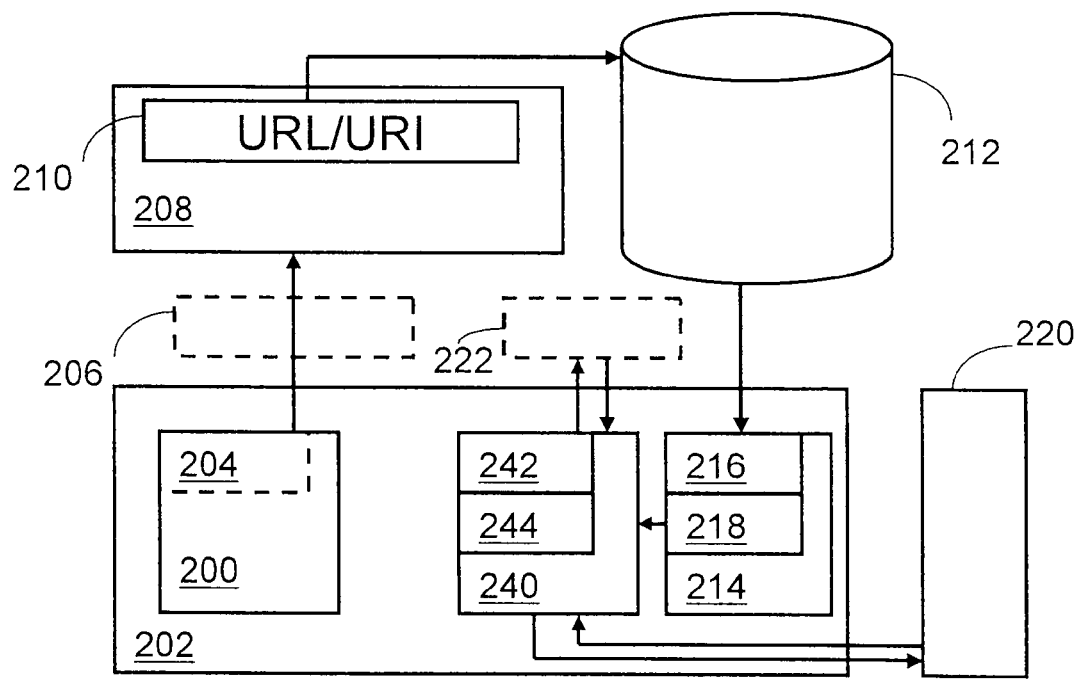
FIG. 2 shows a schematic block diagram of a system according to an embodiment of the invention.

In FIG. 1 method steps according to an embodiment of the invention are depicted which might be understood more easily when described in combination with an embodiment of the system shown in FIG. 2.

In step S100 metadata from characteristics of a first software program 200 stored on a storage medium of a computer 202 is determined, e.g. by a metadata determination unit 204. Metadata might be determined by determining hash values of the first software program 200 files, or for instance taking into account a version number of the software program, a language, a digital signature or a build time-stamp of the first software program. The term "computer" shall refer as well to devices including micro-processors, e.g. consoles, hand-helds, cellular phones or personal computers for which illegitimate copies of software programs might be distributed. The storage medium might be a local drive, a network drive, a disc or a memory drive.

A hash function is any well-defined procedure or mathematical function that converts a large, possibly variable-sized amount of data into a small datum, usually a single integer. The values returned by a hash function are called hash values, hash codes, hash sums, checksums or simply hashes. This function might be implemented in the software program 200 to calculate the hash values of the main executable or any other file(s) from the software program 200.

The used metadata should reflect features of the software program that are changed when an illegitimate copy of the software program is produced. For instance, when an illegitimate copy is generated, copy protection parts of the software program might be removed so that the illegitimate software program can be distributed freely. Copy protection parts may be copy protection or digital rights management modules, envelopes or layers. Beside this, illegitimate copies of software programs often have files removed or compressed and digital signatures are removed or further files are added.

For instance, the copy protection parts might include an individual customer project application (CPA) number for a respective software program. In order to identify different versions of the software program intended for different territories or languages a transaction number may also be used. In some embodiments of the invention, both, the CPA and the transaction number are available by using an application programming interface (API) when the copy protection is still present, i.e. a legitimate copy or version of the software program is used. However, when the copy protection is removed, the corresponding API would return a different number or no value at all. Consequently, the CPA together with the transaction number might be used as the metadata to distinguish between an illegitimate copy and a legitimate copy.

For instance, the software program comes with intro movies stored in a lossless video format, often for the illegitimate copy of the software program such video files are re-encoded with a video format allowing higher compression to reduce the size of the software program for easier online distribution. The size as well as the changed hash value of such multimedia files (i.e. movie, audio, textures) can be used as metadata to distinguish between the legitimate copy of the software program and the illegitimate copy of the software program.

For instance, the software program comes with files like readme text files, etc. Often such files are completely removed for the illegitimate copy of the software program, but other files are added. These changes in the file structure in an installation folder of the software program can also be considered as metadata.

For instance, the executable of a software program as well as software libraries (i.e. dll files) have data embedded called resources, which are read-only and usually set during compilation of the software program. Each resource has a type and a name, both being either numeric identifiers or strings. These values are often changed for the illegitimate copy of the software program. The values of the resources of the software program can also be considered as metadata.

For instance, the executable of a software program as well as software libraries (i.e. dll files) might be digitally signed. The signature is applied by the developer or the publisher of a software program. A signature is a mathematical scheme for demonstrating the authenticity of a digital message or document. A valid digital signature gives a recipient reason to believe that the message or content was created by a known sender, and that it was not altered in transit. It is comparable to a seal and is destroyed if the executable of a software program or a software library is altered for the illegitimate copy of the software program. The existence and integrity of such a signature can also be considered as metadata.

The software program might be a software application, like e.g. a word processing program, a table sheet calculation program, or a game application. The metadata determination unit 204 might be a separate unit or might be included in the first software program 200.

It is also possible to determine metadata of the first software program 200 by a third party software application 206, for instance, a games platform, an antivirus software or an operating system software or a software library.

In a step S102 it is checked whether the determined metadata of the first software program 200 corresponds to metadata of a legitimate copy, e.g. is equal to metadata of a legitimate copy. Metadata of the legitimate copy might be stored in the first software program 200 or might be provided as a service stored in a local or remote database table. For instance, it is possible that the metadata of the legitimate copy is stored in a first server 208 to which the determined metadata of the first software program 200 is transmitted.

If the metadata determined from characteristics of the first software program 200 does not correspond to the metadata of a legitimate copy in a step S104 a patch or software patch 214 is transmitted to the computer 202. The term patch or software patch 214 is used to describe a piece of software for updating a computer program or its supporting data. For instance, the patch can contain an updated legitimate executable, software libraries and data files.

The patch 214 includes a first patch component 216 and a second patch component 218. The first patch component 216 is used to replace at least a part of the illegitimate copy with a legitimate software component 242 and the second patch component 218 provides for instance a graphical user interface 244 (GUI) like an authentication dialog, authentication email, short message service (SMS) or multimedia message service (MMS) for submitting information to a user of the software program.

The patch 214 might be configured as an archive. Then, the archive has to be unpacked into the software's installation directory on a writable medium used by the computer, e.g. a hard disc, memory stick, USE stick and overwrites the files of the illegitimate copy with genuine files of the legitimate copy. Unpacking and execution (including overwriting such files) of the patch may be performed automatically by the first software program 200 or by the third party software application 206 as explained in more detail with regard to first to fourth scenarios below.

In a first scenario, the first software program 200 downloads the patch 214, for instance from a webserver, a local drive, a network drive, a disc or a memory drive and stores it on the computer 202, wherein the patch 214 is configured as a setup/installer program. Afterwards, the first software program 200 executes the patch 214, for instance with the windows API (application program interface): ShellExecute. While executed, the patch 214 copies (and might overwrite) files to a software program installation directory and generates a second software program 240 including the legitimate software component 242.

In a second scenario, the first software program 200 downloads the patch 214, for instance from a webserver, a local drive, a network drive, a disc or a memory drive and stores it on the computer 202, wherein the patch 214 is configured as an archive. Afterwards the first software program 200 extracts (e.g. un-zips) files from the archive (and might overwrite existing files) to the first software program installation directory and generates the second software program 240 including the legitimate software component 242.

In a third and fourth scenario, the patch is downloaded via the third party software application 206, for instance from a webserver, a local drive, a network drive, a disc or a memory drive and stored on the computer 202.

In the third scenario, the patch 214 is configured as a setup/installer program and after being stored on the computer 202, it is executed by the third party software application 206, for instance with the windows API: ShellExecute. While executed, the patch 214 copies (and might overwrite) files to the first software program installation directory and generates the second software program 240 including the legitimate software component 242.

In the fourth scenario, the patch 214 is configured as an archive, and after being stored on the computer 202, it is extracted (unzipped) by the third party software application 206 (and might overwrite existing files) to the first software program installation directory and generates the second software program 240 including the legitimate software component 242.

Consequently, the second software program 240 is generated by applying the patch 214 to the first software program 200.

It is also possible that after detecting an illegitimate copy on the computer 202, information about an update for the software program is transmitted to the computer 202 and displayed to the user. If the user requests the download and installation of the update, the patch 214 is delivered to the user and either installed automatically or after confirmation by the user.

The use of the first patch component 216 when replacing at least a part of the illegitimate copy results in the second software program 240 with the corresponding metadata of a legitimate copy. In addition the graphical user interface 244 is provided. The graphical user interface 244, for instance can show a dialog offering a trial period for testing the legitimate copy of the software program and provide the possibility to acquire (i.e. purchase) an authentication token (i.e. serial number). Software programs using this feature are also called "try and buy" software. In S108 the graphical user interface 244 is displayed and the user is asked for an authentication token. If no correct authentication token is inputted, the second software program 240 can not be used.

The display of the graphical user interface 244 might be started not immediately after the second software program 240 has been generated, but only after a predetermined amount of time, e.g. use time of the legitimate copy has been elapsed. Thereby, there is a higher likelihood that a user will get accustomed to the software and, therefore, the user is interested in paying for using it further.

By displaying the graphical user interface 244 to the user, the user might be informed that he can buy a legitimate copy of the software program or unlock the software program, if the user already owns a legitimate authentication token for the respective software program. The second patch component 218 can e.g. show a link to an online shop or can describe any other way of acquiring a legitimate authentication token.

The user may acquire the authentication token in S110 from a second server 220. Afterwards, the authentication token is verified in S112. The authentication token might be a serial number, alphanumeric key, purchase bound to a user account, license file or a similar authentication code.

If the authentication token is positively verified, the second software program 240 is labeled as a legitimate copy of the software program in S114. The verification may be performed by a third server 222 or by a verification software component implemented in the second software program 240. The labeling might include ensuring that the metadata of the second software program 240 corresponds to the metadata of the legitimate copy. It might further include an additional information based on the positive verification.

In order to transmit the patch 214 to the computer 202 in the embodiment of the system according to FIG. 2 the first server 208 includes an address, e.g. a URL/URI (Uniform Resource Locator/Uniform Resource Identifier) of a separate archive 212, through which for instance a server or local program is adapted to transmit the patch 214 to the computer 202 (i.e. download from server or copy from software program installation device like a DVD).

Figure 3:
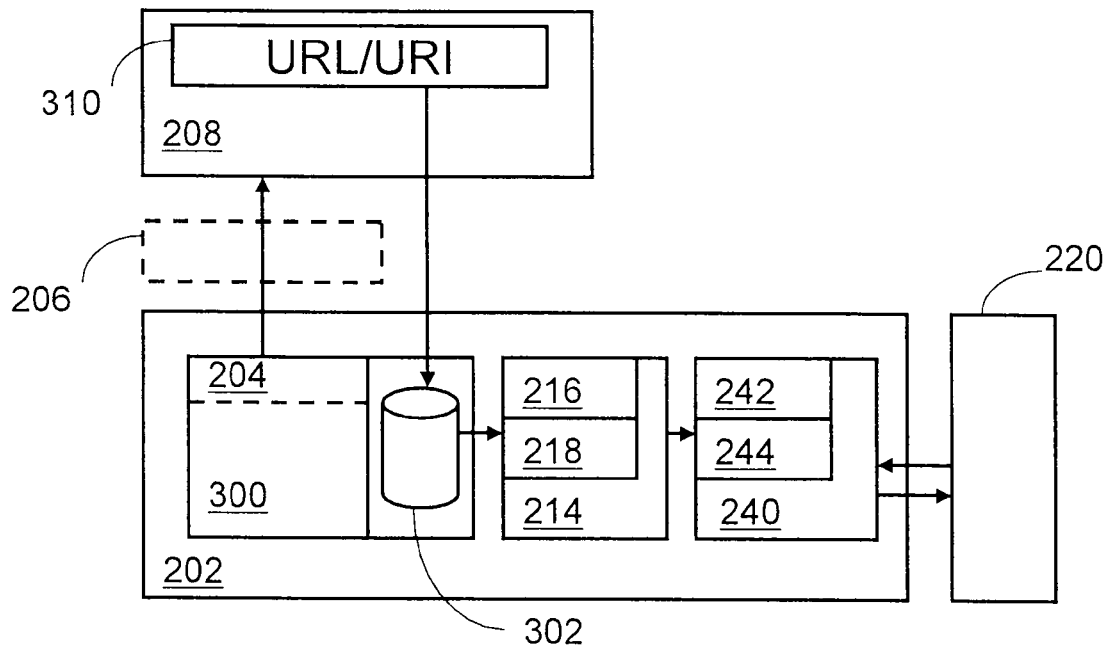
FIG. 3 shows a schematic block diagram of a system according to a further embodiment of the invention.

In accordance to a further embodiment, depicted in FIG. 3, the illegitimate copy 300 of the software program includes an archive 302 which is adapted to provide the patch 214 including the first patch component 216 and the second patch component 218. The archive 302 might be referred to by providing a respective address, e.g. a URL/URI 320 to data stored in the first server 208. According to the embodiment depicted in FIG. 3 the authentication token is also acquired from a second server 220 and verified thereafter.

With this embodiment less data has to be transmitted from a distant server to the computer 202, because it is not necessary to transmit the whole patch 214 to the computer 202, since it is already present in the illegitimate copy 300. Therefore, the download time is reduced and the publisher or online retailer of the software program may have reduced or no costs for hosting the archive and for downloading.

Figure 4:
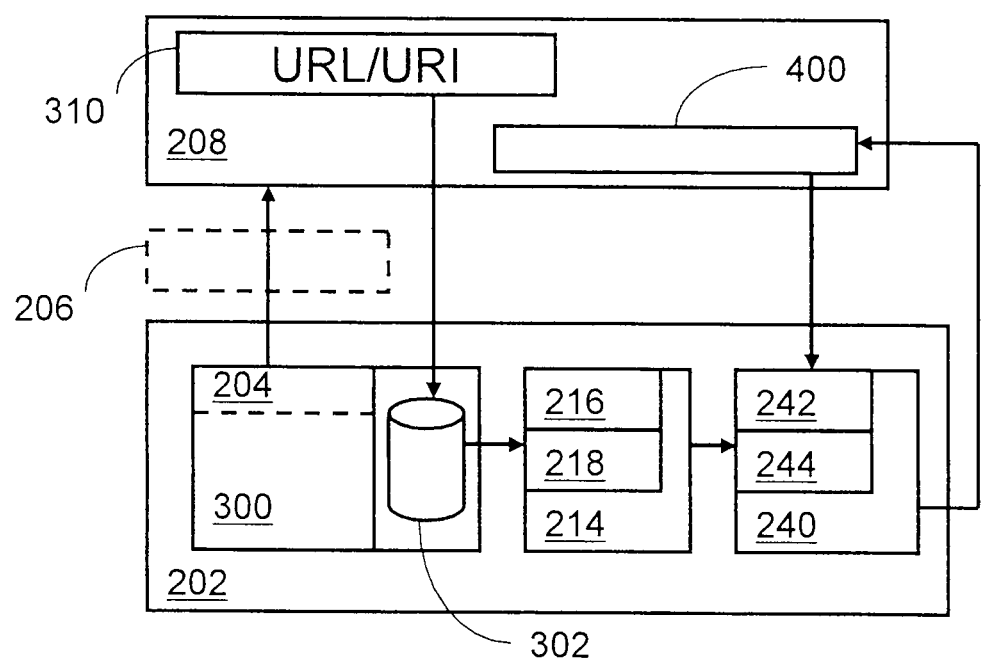
FIG. 4 shows a schematic block diagram of a further embodiment of the invention.

However, in accordance to the further embodiment depicted in FIG. 4 it might also be possible that the first server 208 includes an authentication token providing unit 400 that might be addressed by the second software program 240 of the computer 202 and might provide an authentication token to it.

With the proposed method and system it is possible to implement the following embodiments.

In an embodiment the original version of a game application is installed to the hard disk drive of a computer 202. A user may download an illegitimate (cracked or pirated) executable file(s), libraries and other files and replaces the original, genuine files with the illegitimate copy. This action might circumvent the protection scheme of the original version of the personal computer game. After two hours of game play the game application launches a software component 204 which calculates the metadata of the game application (including the illegitimate executable) and sends it to the server 208 which recognizes the running game application as a "cracked" version, i.e. an illegitimate copy. The software component 204 stops the actual game application and replaces the illegitimate copy with a genuine one located in the installation folder of the game application and adds a dynamic link library (DLL) which shows a dialog through the GUI upon the next start of the game application indicating where to acquire an authentication token e.g. a serial number for the game application and which also performs an online activation (authentication for a serial number or alphanumeric key on a remote server, this may be performed by using a secure channel between the client personal computer and the activation server transferring xml-based requests and responses).

A further example is that the original version of a software program is installed to the hard disc drive of a computer 202. A user may download an illegitimate (cracked or pirated) executable and replaces the original, genuine executable with the illegitimate copy. This action also circumvents the protection scheme of the original version of the software. Afterwards, the user downloads and runs auto-patching software (provided by the publisher/developer or distributor of the software or by any authorized third party company). The auto-patching software calculates metadata of the application (including the illegitimate executable copy) and transmits it to a server 208 which recognizes the installed software as a cracked version, i.e. an illegitimate copy. The auto-patching software replaces the illegitimate copy with a genuine copy downloaded from a given URL (web server) 212 and adds a dynamic link library (DLL) to the installation folder of the software which might show a dialog on the next game start where to create and buy a user account for the personal computer game and which also performs an online activation (authentication for given credentials of a user account). For instance, this involves a user account server where the user of the personal computer creates a user account and procedure to purchase software and bind it to this user account.

It is also possible to store user data that has been acquired while running the illegitimate copy and allowing the use of the stored user data when later running the legitimate copy. With this embodiment it is possible to provide a user with added value when he changes from the illegitimate copy to the legitimate copy, because e.g. user setting might be re-used or levels in an adventure game that have been solved when running the illegitimate copy might be considered to be solved when running the legitimate copy, too, so that the user does not have to replay the levels again. The patch may execute code components that identify and extract user data acquired while running an illegitimate copy. The extracted user data may then be inserted or compiled into code components of the generated legitimate copy and stored in the computer.

With the proposed method and system nonpaying customers can be turned easily into paying customers. It is easy to prevent unauthorized usage of the metadata, because it is easy to change the metadata and/or the hash function that is used for checking whether a legitimate copy is present and in addition, it is also possible to easily change the archive location of the genuine files of the legitimate copy. For instance, said metadata and/or hash function may be changed upon every execution of the check by metadata determination unit 204, 206 or after the version of the metadata determination unit 204, 206 is changed.

The metadata values for both the original version of a software program as well as illegitimate copies are stored on the server 208 and can be updated after new illegitimate copies are distributed. This ensures complete coverage and individual patching possibilities for each illegitimate copy.

The invention claimed is:

1. Method for replacing an illegitimate copy of a software program with a legitimate copy, comprising:
   determining, using circuitry, metadata from characteristics of a first software program being stored on a storage medium of a computer;
   transmitting, using the circuitry, a patch from a first server to the computer, if the metadata does not correspond to metadata of a legitimate copy of the first software program;
   generating, using the circuitry, a second software program by replacing at least a part of the first software program using code components of the patch, which identify and extract user data acquired from running the illegitimate copy, the extracted user data being inserted or compiled into the generated second software program;

displaying, using the circuitry, a graphical user interface on launch of the second software program;

requesting, using the circuitry, an authentication token;

acquiring, using the circuitry, the authentication token from a second server;

verifying, using the circuitry, the authentication token; and labeling, using the circuitry, the second software program as a legitimate copy and Unlocking the second software program, using the circuitry, if the authentication token is positively verified.

2. Method for replacing the illegitimate copy according to claim 1, further comprising:

transmitting, using the circuitry, the metadata to the first server; and comparing, using the circuitry, the metadata with the metadata of the legitimate copy in the first server.

3. Method for replacing an illegitimate copy according to claim 2, further comprising:

comparing, using the circuitry, the metadata with the metadata of one or more known illegitimate copies in the first server.

4. Method for replacing an illegitimate copy according to claim 1, further comprising:

comparing, using the circuitry, the metadata with the metadata of the legitimate copy in the computer.

5. Method for replacing an illegitimate copy according to claim 1, wherein the patch includes:

a first patch component for replacing at least a part of the illegitimate copy that resulted in the metadata not corresponding to the metadata of the legitimate copy, and a second patch component, which provides the graphical user interface.

6. Method for replacing an illegitimate copy according to claim 1, wherein the illegitimate copy of the software program includes code components representing the graphical user interface, the method further comprising:

activating, using the circuitry, the graphical user interface using code components of the patch, when the software program is started.

7. Method for replacing an illegitimate copy according to claim 1, wherein the metadata is determined, using the circuitry, by the illegitimate copy of the software program.

8. Method for replacing an illegitimate copy according to claim 1, wherein the metadata is determined, using the circuitry, by a third software program.

9. Method for replacing an illegitimate copy according to claim 1, further comprising:

requesting, using the circuitry, whether an update of the first software program should be downloaded, if the metadata does not correspond to metadata of a legitimate copy of the software program; and transmitting, using the circuitry, the patch from the first server to the computer and performing, using the circuitry, said step of generating the second software program if it has been accepted to download the update.

10. Method for replacing an illegitimate copy according to claim 1, wherein the metadata is hash data of the executable file of the first software program.

11. Method for replacing an illegitimate copy according to claim 1, wherein the graphical user interface is displayed, using the circuitry, after the second software program has been used a predetermined time.

12. Method for replacing an illegitimate copy according to claim 1, further comprising:

storing, using the circuitry, user data that has been acquired while running the illegitimate copy; and allowing, using the circuitry, the use of the user data when running the legitimate copy.

13. System for replacing an illegitimate copy of a software program with a legitimate copy, comprising:

first circuitry configured to replace at least a part of the illegitimate copy of the software program on a computer using a patch including code components, which identify and extract user data acquired from running the illegitimate copy, and configured to activate a display of a graphical user interface on the computer using the patch;

second circuitry to transmit the patch to the computer after having identified that metadata determined from characteristics of a first software program being stored on the computer does not correspond to metadata of the legitimate copy of the software program, the patch being configured to insert or compile the extracted user data from running the illegitimate copy into the legitimate copy; and third circuitry configured to transmit an authentication token to the computer upon receipt of a request from the computer for the authentication token, the request being initiated through the graphical user interface, and to unlock the legitimate copy of the software program if the authentication token is positively verified.

14. System for replacing an illegitimate copy of a software program with a legitimate copy according to claim 13, wherein the second circuitry is further configured to compare the metadata of the first software program with the metadata of the legitimate copy.

15. Software patch stored on a non transitory computer-readable storage medium having code components stored therein, which when executed cause circuitry to:

replace at least a part of an illegitimate copy of a first software program on a computer using the code components of the software patch to generate a second software program, the code components of the software patch identifying an extracting user data acquired from running the illegitimate copy, the extracted user data being inserted or compiled into the generated second software program;

activate a display of a graphical user interface on the computer, when the software patch is stored and launched on the computer after metadata determined from characteristics of a first software program being stored on the computer does not correspond to metadata of a legitimate copy of the software program, request an authentication token;

acquire the authentication token from a server;

verify the authentication token; and label the second software program as a legitimate copy and unlock the second software program if the authentication token is positively verified.

16. Method for making an illegitimate copy of a software program into a legitimate copy, comprising:

transmitting, using circuitry, a patch from a first server to a computer;

determining, using the circuitry, metadata from characteristics of a first software program being stored on a storage medium of the computer;

generating, using the circuitry, if the metadata does not correspond to metadata of the legitimate copy of the first software program using code components of the patch, which identify and extract user data acquired from running the illegitimate copy, the extracted user data being inserted or complied into the generated second software program;
displaying, using the circuitry, a graphical user interface on launch of the second Software program;
requesting, using the circuitry, and authentication token;
verifying, using the circuitry, the authentication token; and
labeling, using the circuitry, the second software program as the legitimate copy and unlocking the second software program, using the circuitry, if the authentication token is positively verified.

* * * * *